United States Patent
Ido (10) Patent No.: US 11,885,634 B2
(45) Date of Patent: Jan. 30, 2024

(54) DISPLAY SYSTEM AND DISPLAY PROGRAM

(71) Applicant: AISIN CORPORATION, Kariya (JP)

(72) Inventor: Yuichiro Ido, Aichi (JP)

(73) Assignee: AISIN CORPORATION, Kariya (JP)

( * ) Notice: Subject to any disclaimer, the term of this patent is extended or adjusted under 35 U.S.C. 154(b) by 801 days.

(21) Appl. No.: 16/967,848

(22) PCT Filed: Mar. 4, 2019

(86) PCT No.: PCT/JP2019/008464
§ 371 (c)(1),
(2) Date: Aug. 6, 2020

(87) PCT Pub. No.: WO2019/188024
PCT Pub. Date: Oct. 3, 2019

(65) Prior Publication Data
US 2021/0048308 A1    Feb. 18, 2021

(30) Foreign Application Priority Data

Mar. 29, 2018    (JP) .................................. 2018-063559

(51) Int. Cl.
*G01C 21/34*    (2006.01)
*G01C 21/36*    (2006.01)
(Continued)

(52) U.S. Cl.
CPC .......... *G01C 21/3658* (2013.01); *B60K 35/00* (2013.01); *G08G 1/09626* (2013.01); *B60K 2370/152* (2019.05); *B60K 2370/166* (2019.05)

(58) Field of Classification Search
CPC ...... G01C 21/34; G01C 21/00; G08G 1/0968; G09B 29/00; G09B 29/10
See application file for complete search history.

(56) References Cited

U.S. PATENT DOCUMENTS

| 7,840,349 | B2 * | 11/2010 | Tava ................. | G01C 21/3658 701/457 |
| 2001/0027377 | A1 * | 10/2001 | Shimabara ......... | G01C 21/3658 701/437 |

(Continued)

FOREIGN PATENT DOCUMENTS

| JP | 2001-272240 A | 10/2001 |
| JP | 2008-111815 A | 5/2008 |

(Continued)

OTHER PUBLICATIONS

International Search Report for PCT/JP2019/008464 dated May 14, 2019 [PCT/ISA/210].

*Primary Examiner* — Tan Q Nguyen
(74) *Attorney, Agent, or Firm* — Sughrue Mion, PLLC (57) ABSTRACT

An in-vehicle device displaying travel lanes of a vehicle in a predetermined number of display boxes includes an identifying part that identifies travel lanes to be displayed in the display boxes, and identifies travel lanes so a recommended lane which is a travel lane recommended for the vehicle to travel is displayed in one of the display boxes and a maximum number of recommended travel lanes which are travel lanes coinciding with a traveling direction of the recommended lane each are displayed in one of the display boxes; and a display part that displays the identified travel lanes in the display boxes. The identifying part identifies travel lanes while relatively shifting in turn a plurality of travel lanes and the display boxes from a travel lane at one end of the plurality of travel lanes that are on a traveling direction side of the vehicle and being adjacent to each other.

4 Claims, 5 Drawing Sheets

(51) Int. Cl.
*B60K 35/00* (2006.01)
*G08G 1/0962* (2006.01)
*G08G 1/0968* (2006.01)

(56) References Cited

U.S. PATENT DOCUMENTS

| | | | | |
|---|---|---|---|---|
| 2008/0036626 A1* | 2/2008 | Kim | ............... | G01C 21/367 |
| | | | | 701/437 |
| 2009/0177388 A1* | 7/2009 | Schmidt | ............ | G01C 21/3658 |
| | | | | 701/533 |
| 2010/0017117 A1* | 1/2010 | Irie | ............ | G09B 29/10 |
| | | | | 701/532 |
| 2010/0223002 A1 | 9/2010 | Oonichi et al. | | |
| 2010/0292922 A1* | 11/2010 | Tanizaki | ............ | G01C 21/3658 |
| | | | | 701/431 |
| 2011/0015859 A1* | 1/2011 | Kim | ............ | G01C 21/3658 |
| | | | | 340/905 |
| 2012/0191344 A1* | 7/2012 | Iao | ............ | G01C 21/3658 |
| | | | | 701/450 |

FOREIGN PATENT DOCUMENTS

| | | |
|---|---|---|
| JP | 2010-266391 A | 11/2010 |
| JP | 2015-155857 A | 8/2015 |
| JP | 2017-167089 A | 9/2017 |

\* cited by examiner

Lane data arrangement

| 301 | 302 | 303 | 304 | 305 | 306 | 307 | 308 | 309 | 310 | 311 | 312 | 313 | 314 | 315 | 316 |
|---|---|---|---|---|---|---|---|---|---|---|---|---|---|---|---|
| ↙ | ↙ | ↙ | ↙ | ↙ | ↙ | ↙ | ← | ↑ | ↑ | ← | null | null | null | null | null |
| (Travelable) | (Travelable) | (Travelable) | (Travelable) | (Travelable) | (Travelable) | (Travelable) | (Travelable) Recommended | (Travelable) Recommended | (Travelable) Recommended | (Travelable) | | | | | |

FIG. 5B

| f1 | f2 | f3 | f4 | f5 | f6 |
|---|---|---|---|---|---|
| ... | ↙ | ← | ↑ | ↑ | ← |

DISPLAY SYSTEM AND DISPLAY PROGRAM

CROSS REFERENCE TO RELATED APPLICATIONS

This application is a National Stage of International Application No. PCT/JP2019/008464 filed Mar. 4, 2019, claiming priority based on Japanese Patent Application No. 2018-063559 filed Mar. 29, 2018 the contents of which are incorporated in their entirety.

TECHNICAL FIELD

The aspects of the present disclosure relate to a display system and a display program.

BACKGROUND ART

Conventionally, there has been known a navigation device that displays road lane information (see, for example, Patent Literature 1). A navigation device of this Patent Literature 1 has displayed a recommended lane which is a lane recommended to travel. Specifically, the navigation device has a limited number of lanes that can be displayed, and when the number of actual lanes is larger than the number of lanes that can be displayed, lanes to be displayed have been identified and displayed so as to display both of a travel lane which is a lane in which a vehicle is currently traveling and a recommended lane.

CITATIONS LIST

Patent Literature

Patent Literature 1: JP 2015-155857 A

SUMMARY OF THE DISCLOSURE

Technical Problems

However, a technique of Patent Literature 1 has determined an actual travel lane in which the vehicle is currently traveling, and has simultaneously displayed the travel lane and a recommended lane.

Meanwhile, there is a case in which the navigation device cannot determine a travel lane. The inventor of the present application has reached the realities that in any case including the above-described case, it is easier for a driver to make a determination about a lane change when as many lanes travelable in the same direction as a recommended lane as possible are displayed. Namely, for example, there is a case in which depending on a travel environment, it is difficult to make a quick lane change. The inventor of the present application has reached the realities that in the above-described case, when the driver is aware of his/her traveling in a lane travelable in the same direction, the driver can determine not to make a difficult lane change.

When such realities are taken into account, it is desirable for the driver to include, in lanes to be displayed, as many lanes travelable in the same direction as a recommended lane as possible. However, such a matter has not been disclosed in Patent Literature 1.

The aspects of the present disclosure made in view of the above description, and provides a display system and a display program that enable a vehicle to smoothly travel.

Solutions to Problems

To solve the above-described problem and provide the display system and the display program, a display system according to the present invention displays travel lanes of a vehicle in a predetermined number of display boxes, and includes: identifying means for identifying travel lanes that can be displayed in the display boxes, and identifying travel lanes such that a recommended lane is displayed in one of the display boxes and a maximum number of recommended travel lanes each are displayed in one of the display boxes, the recommended lane being a travel lane recommended for the vehicle to travel, and the recommended travel lanes being travel lanes whose traveling directions coincide with a traveling direction of the recommended lane; and display means for displaying the travel lanes identified by the identifying means in the display boxes.

In addition, a display program according to the present disclosure displays travel lanes of a vehicle in a predetermined number of display boxes, and causes a computer to function as: identifying means for identifying travel lanes that can be displayed in the display boxes, and identifying travel lanes such that a recommended lane is displayed in one of the display boxes and a maximum number of recommended travel lanes each are displayed in one of the display boxes, the recommended lane being a travel lane recommended for the vehicle to travel, and the recommended travel lanes being travel lanes whose traveling directions coincide with a traveling direction of the recommended lane; and display means for displaying the travel lanes identified by the identifying means in the display boxes.

Effects of Present Disclosure

According to the display system according to the present invention, travel lanes are identified such that a recommended lane which is a travel lane recommended for the vehicle to travel is displayed in a display box and a maximum number of recommended travel lanes which are travel lanes whose traveling directions coincide with a traveling direction of the recommended lane are displayed in display boxes. By this, for example, travel lanes can be displayed so as to meet the realities that it is easier for a driver to make a determination about a lane change when as many recommended travel lanes as possible are displayed, the recommended travel lanes being travel lanes whose traveling directions coincide with a traveling direction of a recommended lane. Thus, for example, unnecessary movement between travel lanes can be reduced, enabling the vehicle to smoothly travel.

According to the display program according to the present invention, travel lanes are identified such that a recommended lane which is a travel lane recommended for the vehicle to travel is displayed in a display box and a maximum number of recommended travel lanes which are travel lanes whose traveling directions coincide with a traveling direction of the recommended lane are displayed in display boxes. By this, for example, travel lanes can be displayed so as to meet the realities that it is easier for a driver to make a determination about a lane change when as many recommended travel lanes as possible are displayed, the recommended travel lanes being travel lanes whose traveling directions coincide with a traveling direction of a recommended lane. Thus, for example, unnecessary movement between travel lanes can be reduced, enabling the vehicle to smoothly travel.

BRIEF DESCRIPTION OF DRAWINGS

FIG. 3 is a diagram exemplifying a lane data arrangement and display boxes, and FIG. 3(a) exemplifies a lane data arrangement and FIG. 3(b) exemplifies exemplary display of display boxes.

FIG. 4 is a diagram exemplifying a lane data arrangement and display boxes, and FIG. 4(a) exemplifies a lane data arrangement and FIG. 4(b) exemplifies exemplary display of display boxes.

FIG. 5 is a diagram exemplifying a lane data arrangement and display boxes, and FIG. 5(a) exemplifies a lane data arrangement and FIG. 5(b) exemplifies exemplary display of display boxes.

DESCRIPTION OF EMBODIMENTS

An embodiment of a display system and a display program according to the present disclosure will be described in detail below with reference to the drawings. Note, however, that the present disclosure is not limited to the embodiment.

A display system according to the present disclosure is a system that displays travel lanes of a vehicle in a predetermined number of display boxes, and is a concept including, for example, a dedicated system that displays travel lanes or a system implemented by implementing a function of displaying travel lanes on a computer used for general purposes (as an example, a personal computer, a portable terminal such as a smartphone, etc.). In addition, the display system is a concept including, for example, a system implemented by implementing a function of displaying travel lanes of the vehicle in a predetermined number of display boxes on an in-vehicle device, a center device, etc., and includes, as an example, identifying means and display means.

Here, the "in-vehicle device" is a device mounted on the vehicle, and is specifically a concept including a navigation device for in-vehicle use. The "center device" is a device that performs communication with the in-vehicle device, and is specifically a concept including a server device having a predetermined computer mounted thereon.

In addition, the "predetermined number" is any predetermined number and is, for example, three to seven. The "display boxes" are boxes that display travel lanes of the vehicle, and are specifically at least a partial region on a display.

In addition, the "identifying means" is means for identifying travel lanes that can be displayed in the display boxes, and is specifically means for identifying travel lanes such that a recommended lane which is a travel lane recommended for the vehicle to travel is displayed in a display box and a maximum number of recommended travel lanes including travel lanes in the same direction as the recommended lane are displayed. The "identifying means" is, for example, means for identifying travel lanes that can be displayed in the display boxes, while relatively shifting in turn a plurality of travel lanes and the display boxes from a travel lane at one end of the plurality of travel lanes, the plurality of travel lanes being on a traveling direction side of the vehicle and being adjacent to each other. In addition, the "identifying means" is, for example, means for determining, when travel lanes that are not displayed are present adjacent to a travel lane to be displayed in a display box at an end of the plurality of display boxes, that the display box at the end is a display prohibited box that does not display a travel lane, and identifying travel lanes such that in display permitted boxes which are those of the plurality of display boxes other than the display prohibited box, a recommended lane is displayed and a maximum number of recommended travel lanes are displayed. In addition, the "identifying means" is, for example, means for identifying travel lanes that can be displayed in the display boxes, by identifying locations of display boxes including a maximum number of recommended travel lanes from among locations of the display boxes for a plurality of travel lanes obtained when the predetermined number of display boxes are sequentially shifted.

The "travel lanes" are lanes on a traveling direction side on a road on which the vehicle travels, and are specifically a plurality of lanes adjacent to each other, and are a concept including, for example, a recommended lane, recommended travel lanes, travelable lanes, and the like, on a travel route which are obtained when the travel route is searched for, the travel route being a route along which the vehicle is to travel to reach a destination.

The "recommended lane" is a travel lane on the travel route, and is specifically a travel lane recommended for the vehicle to travel and is, for example, a single travel lane that is most recommended for the vehicle to travel among a plurality of travel lanes. The "recommended travel lanes" are travel lanes including travel lanes in the same direction as the recommended lane and are, for example, one or more travel lanes other than the recommended lane among the plurality of travel lanes. The "travelable lanes" are travel lanes including travel lanes in different directions than the recommended lane and are, for example, one or more travel lanes other than the recommended lane and the recommended travel lanes among the plurality of travel lanes.

The "travel lanes in the same direction as the recommended lane" are travel lanes whose traveling directions coincide with a traveling direction of the recommended lane, and are a concept indicating, for example, travel lanes whose traveling directions are a straight-ahead direction when the traveling direction of the recommended lane is the straight-ahead direction, and travel lanes whose traveling directions are a right turn direction when the traveling direction of the recommended lane is the right turn direction. The "travel lanes in different directions than the recommended lane" are travel lanes whose traveling directions do not coincide with the traveling direction of the recommended lane, and are a concept indicating, for example, travel lanes whose traveling directions are the right turn direction or a left turn direction when the traveling direction of the recommended lane is the straight-ahead direction.

The "while relatively shifting in turn a plurality of travel lanes and the display boxes from a travel lane at one end of the plurality of travel lanes" is a technique for identifying, by the identifying means, travel lanes to be displayed in the display boxes, and is specifically an information processing technique and is, for example, an information processing technique performed without comparing the number of pieces of information that identify respective travel lanes with the number of display boxes. In addition, the "while relatively shifting in turn a plurality of travel lanes and the display boxes from a travel lane at one end of the plurality of travel lanes" is a concept including, for example, an information processing technique corresponding to relatively shifting the display boxes from a left end to a right end of a plurality of travel lanes, or an information processing technique corresponding to relatively shifting the display boxes from the right end to left end of the plurality of travel lanes. In addition, a specific information processing technique corresponding to the "while relatively shifting in turn a plurality of travel lanes and the display boxes from a travel lane at one end of the plurality of travel lanes" is any technique. The following embodiment exemplifies and describes, though not limited to, a technique in which pieces of data that identify respective travel lanes are stored in an arrangement one by one in order from one end to the other of the plurality of travel lanes, and a number of the pieces of stored data that corresponds to the number of display boxes are sequentially selected and subjected to information processing.

In addition, the "display prohibited box" is a display box at a left end or a display box at a right end of the plurality of display boxes when travel lanes that are not displayed are present adjacent to a travel lane to be displayed in a display box at an end of the plurality of display boxes, and is specifically a box that does not display a travel lane. The "display permitted boxes" are display boxes other than the display prohibited box among the plurality of display boxes, and are boxes that can display travel lanes.

In addition, the "display means" is means for displaying travel lanes identified by the identifying means in the display boxes, and is, for example, means for displaying, in a display prohibited box, information indicating that in addition to travel lanes displayed in display permitted boxes, not-displayed travel lanes are also present on a display prohibited box side of the plurality of display boxes. Information displayed as the "information indicating that in addition to travel lanes displayed in display permitted boxes, not-displayed travel lanes are also present on a display prohibited box side of the plurality of display boxes" is any information and may be, for example, text information or image information. The following embodiment exemplifies and describes a case showing that the image information " . . . " is displayed to show the presence of not-displayed travel lanes, and the not-displayed travel lanes can be displayed by any operation such as scrolling.

The following embodiment describes a case in which the "display system" is implemented by an in-vehicle device and the "predetermined number" of display boxes is six.

Note that in the following a vehicle having the in-vehicle device mounted thereon is described referred to as "host vehicle" or "host car". In addition, the "host vehicle" or "host car" is a concept including, for example, a four-wheeled vehicle, a two-wheeled vehicle, and a bicycle. In the following, a case in which the host vehicle is a four-wheeled vehicle will be described. In addition, for the in-vehicle device which will be described below, features related to the display system will be described. On the other hand, features other than the features related to the display system are the same as those of publicly known in-vehicle devices and thus description thereof is omitted.

(Configuration)

Figure 1:
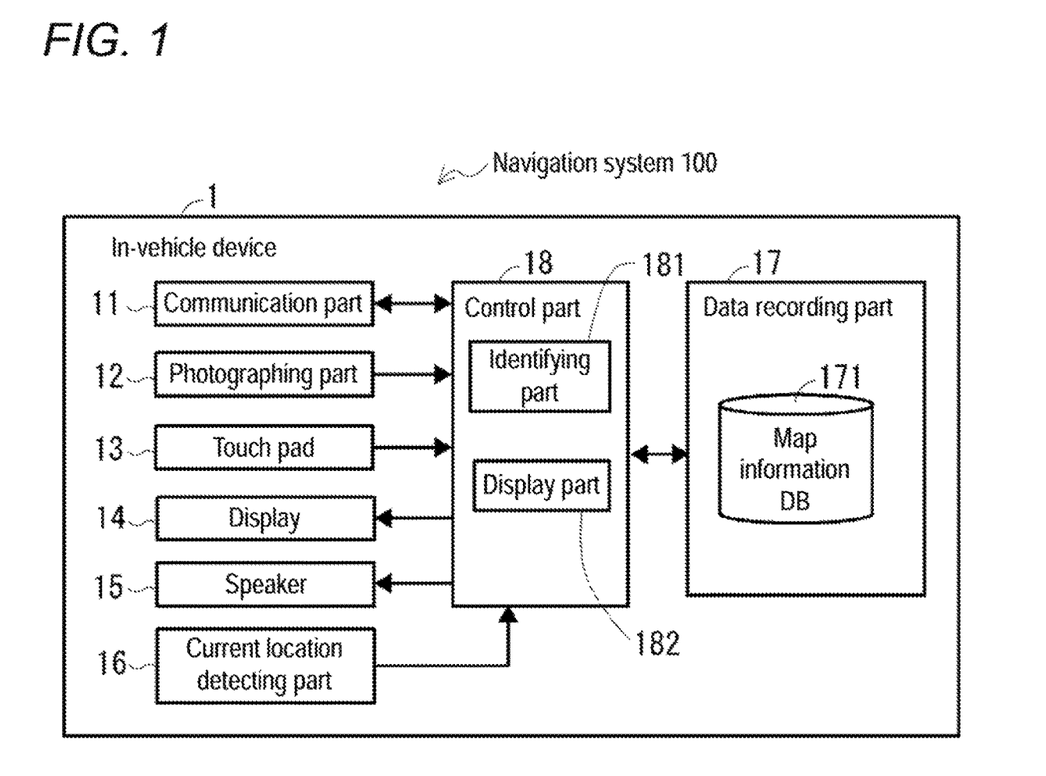
FIG. 1 is a block diagram exemplifying a navigation system according to an embodiment of the present disclosure.

First, a navigation system 100 according to the present embodiment will be described. FIG. 1 is a block diagram exemplifying a navigation system according to the embodiment of the present disclosure. The navigation system 100 is a system including a display system and includes, for example, an in-vehicle device 1. Note that in practice the navigation system 100 is also provided with a center device that performs various types of processes by performing communication with the in-vehicle device 1, but since the center device can be configured in the same manner as publicly known center devices, here, depiction and description thereof are omitted.

(Configuration—In-Vehicle Device)

The in-vehicle device 1 is a display system, and is specifically mounted on a vehicle that is driven by batteries. The in-vehicle device 1 includes, for example, a communication part 11, a photographing part 12, a touch pad 13, a display 14, a speaker 15, a current location detecting part 16, a data recording part 17, and a control part 18.

(Configuration—In-Vehicle Device—Communication Part)

The communication part 11 is communication means for communicating with external devices through a network (depiction is omitted). A specific type and configuration of the communication part 11 are any type and configuration. For example, publicly known mobile wireless communication means or publicly known wireless communication means for a VICS (registered trademark) system through FM multiplex broadcasting or beacons can be used.

(Configuration—In-Vehicle Device—Photographing Part)

The photographing part 12 is photographing means for photographing images.

A specific type and configuration of the photographing part 12 are any type and configuration. For example, the photographing part 12 can be configured to include an external camera that photographs surrounding images which are images around the host vehicle, and an internal camera that photographs in-car images of the host vehicle.

(Configuration—In-Vehicle Device—Touch Pad)

The touch pad 13 is operating means for accepting various types of operation input from a user by being pressed with a finger of the user, etc. A specific configuration of the touch pad 13 is any configuration. For example, a publicly known resistive or capacitive touch pad including operation position detecting means can be used.

(Configuration—In-Vehicle Device—Display)

The display 14 is image display means for displaying various types of images based on control by the control part 18. A specific configuration of the display 14 is any configuration. For example, a flat panel display, etc., such as a publicly known liquid crystal display or organic EL display can be used. Note that the above-described touch pad 13 and the display 14 may be integrally formed as a touch panel.

(Configuration—In-Vehicle Device—Speaker)

The speaker 15 is audio output means for outputting various types of audio based on control by the control part 18. A specific mode of audio outputted from the speaker 15 is any mode, and synthetic audio generated as necessary or pre-recorded audio can be outputted.

(Configuration—In-Vehicle Device—Current Location Detecting Part)

The current location detecting part 16 is current location obtaining means for obtaining a current location (e.g., coordinates on a map) of the host vehicle. The current location detecting part 16 includes a GPS and a gyro sensor (means for measuring a direction) and a range sensor (depiction of all of them is omitted), and detects a current location (coordinates) which is a current location of the in-vehicle device 1, a direction, and the like, by a publicly known method.

(Configuration—In-Vehicle Device—Data Recording Part)

The data recording part 17 is recording means for recording programs and various types of data which are required for operation of the in-vehicle device 1, and is formed using, for example, a hard disk (depiction is omitted) serving as an external recording device. Note, however, that instead of a hard disk or together with a hard disk, any other recording medium including a magnetic recording medium such as a magnetic disk or an optical recording medium such as a DVD or a Blu-ray disc can be used.

In addition, the data recording part 17 includes a map information database (hereinafter, the database is referred to as "DB") 171.

(Configuration—In-Vehicle Device—Data Recording Part—Map Information DB)

The map information DB 171 is map information storing means for storing map information. Here, the "map information" is information for presenting a map to the user, and is specifically information required to identify locations of various types including roads, intersections on roads, road structures, facilities, etc. The "map information" is configured to include, for example, node data about each node set on a road (e.g., node IDs and coordinates), link data about each link set on a road (e.g., link IDs (note that a link ID is associated with coordinates that identify a location of map information), link names, connection node IDs, road coordinates, road types (e.g., narrow streets, general roads, major national highways, and expressways), road widths, the number of lanes (the number of travel lanes) provided on roads, traveling directions of lanes (traveling directions of travel lanes) provided on roads, lane IDs that uniquely identify respective lanes provided on roads, and traveling directions of roads), ground object data (e.g., traffic lights, traffic signs, guardrails, and facilities), and topographic data. Such map information in the map information DB 171 is recorded by any technique. For example, the map information is recorded by being inputted through a predetermined recording medium, or is recorded by receiving information distributed from a distribution center which is not shown.

(Configuration—In-Vehicle Device—Control Part)

The control part 18 is control means for controlling the in-vehicle device 1, and is specifically a computer configured to include a CPU, various types of programs (including a basic control program such as an OS, and an application program that runs on the OS to implement specific functions) which are interpreted on the CPU, and an internal memory such as a RAM for storing the programs and various types of data. Particularly, a program according to the embodiment substantially forms each part of the control part 18 by being installed on the in-vehicle device 1 through any recording medium or network.

The control part 18 function-conceptually includes an identifying part 181 and a display part 182. The identifying part 181 is identifying means for identifying travel lanes that can be displayed in display boxes, and is specifically means for identifying travel lanes such that a recommended lane which is a travel lane recommended for the vehicle to travel is displayed in a display box and a maximum number of recommended travel lanes including travel lanes in the same direction as the recommended lane are displayed. The display part 182 is display means for displaying the travel lanes identified by the identifying part 181 in the display boxes. Note that processes performed by each part of the control part 18 will be described later.

(Processes)

Figure 2:
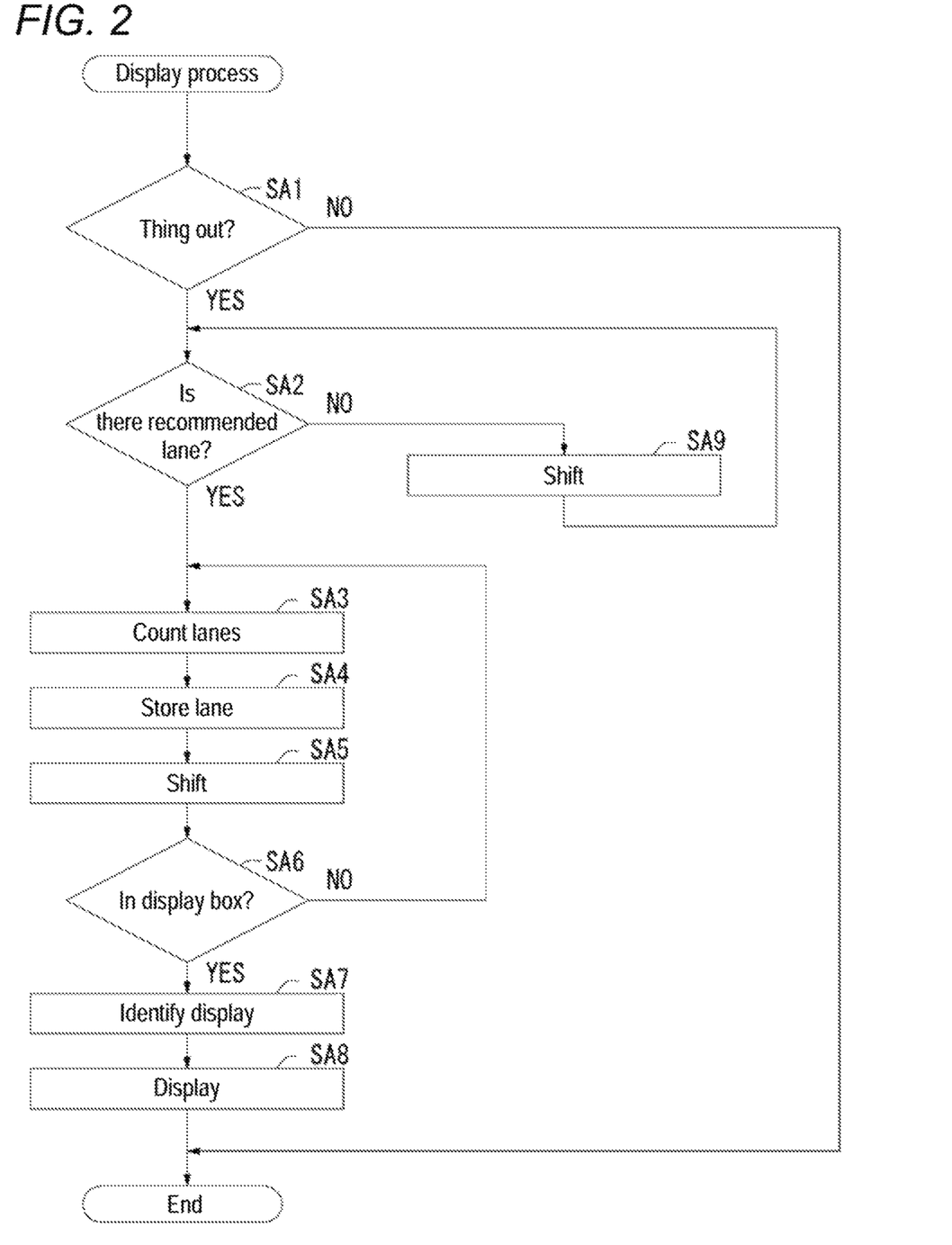
FIG. 2 is a flowchart of a display process.

Next, a display process performed by the navigation system 100 thus configured will be described. FIG. 2 is a flowchart of the display process (in the following description of each process, a step is abbreviated as "S"). The display process is schematically a process performed by the in-vehicle device 1 of the navigation system 100, and is specifically a process of displaying travel lanes in display boxes. Timing at which the display process is performed is any timing. For example, after turning on power to the in-vehicle device 1, the control part 18 of the in-vehicle device 1 accepts a predetermined operation on the touch pad 13 by the user, and searches for a travel route along which the host vehicle is to travel by any technique including publicly known techniques, and when, in a case in which guidance on the searched travel route is being provided, the host vehicle obtains and stores, just before an intersection, information that identifies travel lanes at the intersection, the display process starts up and starts to be performed. Description starts from where the display process starts to be performed.

FIGS. 3 to 5 are diagrams exemplifying lane data arrangements and display boxes, and (a) of each diagram exemplifies a lane data arrangement, and (b) of each diagram exemplifies exemplary display of display boxes. Note that these FIGS. 3 to 5 exemplify information on travel lanes about different intersections, and for convenience of description, there are shown "(recommended)" that identifies a recommended lane, "(recommended travel)" that identifies a recommended travel lane, and "(travelable)" that identifies a travelable lane as information that identifies the types of travel lanes.

Figure 3A:
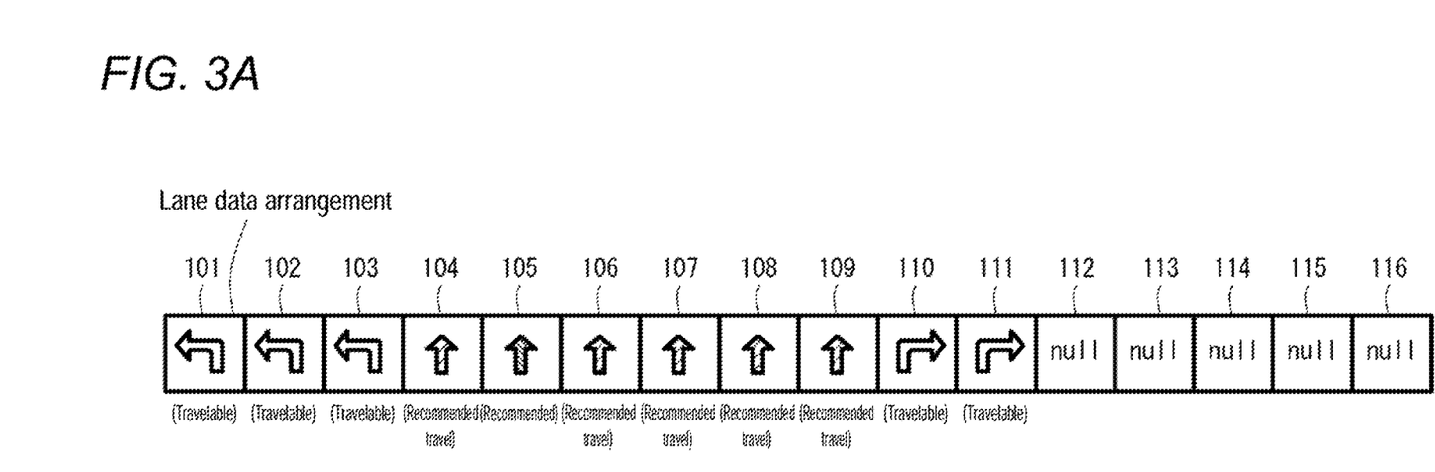
Figure 4A:
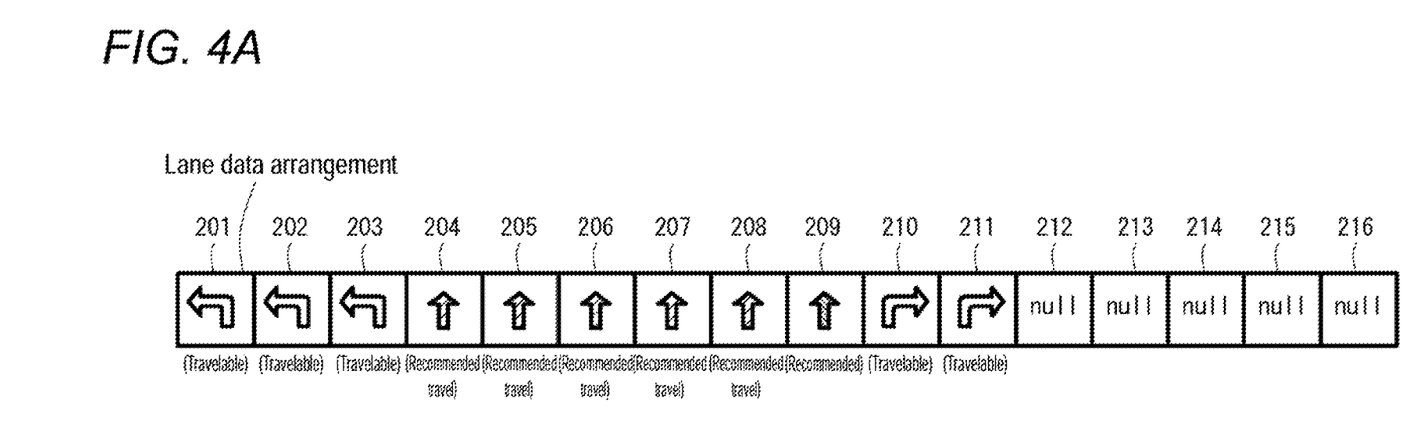
Figure 5A:
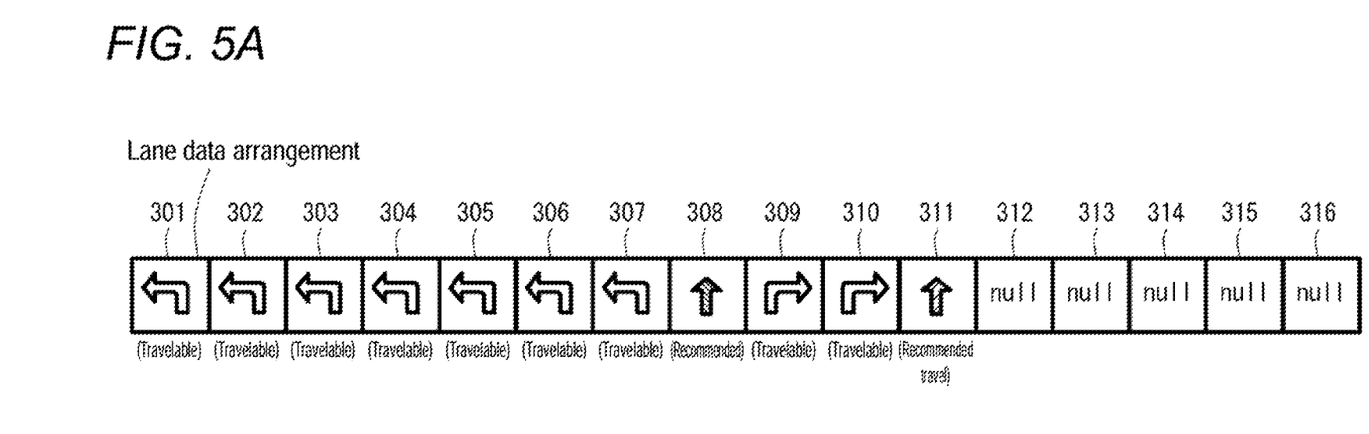

The "lane data arrangements" of FIGS. 3(*a*) to 5(*a*) each are a data structure that identifies a plurality of travel lanes. For example, the "lane data arrangements" each are a data structure that is stored in the RAM in the control part 18 and that stores specific data in turn from a left end in the drawings, i.e., a data structure in which data at the left end in the drawings serves as start data and data at a right end serves as end data. As an example, as shown in each drawing, the "lane data arrangements" each are a data structure that can store a predetermined number (which is set to a larger number than the maximum number of travel lanes at each intersection; e.g., 16) of pieces of lane data. In addition, "lane data" 101 to 116, etc., in each drawing are information that identifies each travel lane and that identifies the location, traveling direction, and type (i.e., a recommended lane, a recommended travel lane, or a travelable lane) of the travel lane. A data format of the "lane data" 101 to 116, etc., in each drawing is any data format. For example, as shown in the drawings, the data format may be image information, or may be text information other than image information or information in any other format. In the following, those shown in the drawings are exemplified and described.

The "lane data" 101 to 116, etc., each identify a location of an actual travel lane on an actual travel route, based on a storage location in the "lane data arrangement". For example, lane data on the left side identifies, for example, that the location of an actual travel lane on an actual travel route is on the left side with reference to a traveling direction of the travel route. In addition, the "lane data" 101 to 116, etc., each identify a direction of a travel lane based on a direction indicated by an arrow, and identify a type of travel lane based on a display form of the arrow (open, hatching from upper right to lower left in the drawings, and hatching from upper left to lower right in the drawings). In addition, "null" for the "lane data" 101 to 116, etc., identifies that there is no travel lane.

Here, for example, for the lane data arrangement of FIG. 3(*a*), there are 11 travel lanes corresponding to the lane data 101 to 111. The lane data 101 identifies that a traveling method of a travel lane at a left end is a left direction (left turn direction) with reference to a traveling direction of a travel route, and the travel lane is a travelable lane. In addition, the lane data 102 and 103 identify that traveling directions of the second and third travel lanes from the left end are the left direction with reference to the traveling direction of the travel route, and the travel lanes are travelable lanes. The lane data 104 identifies that a traveling direction of the fourth travel lane from the left end is a straight-ahead direction with reference to the traveling direction of the travel route, and the travel lane is a recommended travel lane. In addition, the lane data 105 identifies that a traveling direction of the fifth travel lane from the left end is the straight-ahead direction with reference to the traveling direction of the travel route, and the travel lane is a recommended lane. In addition, the lane data 106 to 109 identify that traveling directions of the sixth to ninth travel lanes from the left end are the straight-ahead direction with reference to the traveling direction of the travel route, and the travel lanes are recommended travel lanes. In addition, the lane data 110 and 111 identify that the tenth and eleventh travel lanes from the left end (i.e., the second travel lane from a right end and a travel lane at the right end) are a right direction (right turn direction) with reference to the traveling direction of the travel route, and the travel lanes are travelable lanes. In addition, the lane data 112 to 116 are "null" and identify that there are no travel lanes. Note that lane data of FIG. 4(a) and FIG. 5(a) are the same as those of FIG. 3 and thus description thereof is omitted.

In addition, "display boxes" f1 to f6 of FIGS. 3(b) to 5(b) are the aforementioned display boxes and are, for example, displayed on the display 14.

A specific technique for obtaining and storing, just before an intersection, information on travel lanes at the intersection by the host vehicle at start-up of a display process of FIG. 2 is any technique. For example, the control part 18 obtains a plurality of travel lanes provided at an intersection by referring to the map information in the map information DB 171 and a travel route whose guidance is being provided. First, the control part 18 identifies, as a recommended lane, one of the obtained plurality of travel lanes that is most recommended for the host vehicle to travel, by any technique (e.g., a technique in which it is assumed that the single most recommended travel lane is set taking into account a traveling direction, etc., when a travel route is searched for, and the set single travel lane is identified as a recommended travel lane), identifies, as recommended travel lanes, travel lanes in the same direction as the recommended lane among those of the obtained plurality of travel lanes other than the travel lane identified as the recommended lane, identifies, as travelable lanes, travel lanes among those of the obtained plurality of travel lanes other than the travel lane identified as the recommended lane and the travel lanes identified as the recommended travel lanes, and obtains information that identifies each of the identified recommended lane, recommended travel lanes, and travelable lanes. Then, the control part 18 stores lane data in the lane data arrangements of FIGS. 3(a) to 5(a) as the obtained information that identifies each of the recommended lane, recommended travel lanes, and travelable lanes, and each process will be described. In the following, for FIGS. 3(a) to 5(a), a process can be performed in the same manner, and thus, unless otherwise particularly specified, FIG. 3(a) will be described as a representative example, and FIGS. 4(a) and 5(a) will be described later as appropriate.

At SA1 of FIG. 2, the identifying part 181 determines whether lane data is thinned out. Specifically, the process can be performed in any manner. For example, a lane data arrangement in which lane data is stored at start-up of the display process is referred to by accessing the RAM in the control part 18, and a number of pieces of lane data in the referred lane data arrangement that corresponds to the number of display boxes are sequentially selected starting from lane data at the left end in the drawing toward the right side in the drawing, and a determination is made based on whether "null" is included in the selected lane data. Then, when "null" is included, it is determined that all travel lanes can be displayed, and it is determined that thinning out is not performed (NO at SA1), and the selected lane data is displayed in the display boxes in the same manner as conventional ones, and then the process ends. In addition, when "null" is not included, it is determined that all travel lanes cannot be displayed, and it is determined that thinning out is performed (YES at SA1), and processing transitions to SA2. Here, for example, in the case of FIG. 3(a), a lane data arrangement in which lane data is stored at start-up of the display process is referred to, and six pieces of lane data 101 to 106 corresponding to the number of display boxes are selected starting from lane data at the left end in the drawing in the referred lane data arrangement. Since "null" is not included in the selected lane data, it is determined that thinning out is performed.

At SA2 of FIG. 2, the identifying part 181 determines whether lane data that identifies a recommended lane is included. Specifically, the process can be performed in any manner. For example, the process is performed taking into account that the display box f1 at the left end among the six display boxes f1 to f6 of FIG. 3(b) is a display permitted box when the lane data 101 at the left end among the lane data in the lane data arrangement of FIG. 3(a) is displayed, and in other cases, since travel lanes that are not displayed are present on the left side of the display box f1, the display box f1 is a display prohibited box; the display box f6 at the right end is a display permitted box when the lane data 111 at the right end among the lane data other than "null" in the lane data arrangement of FIG. 3(a) is displayed, and in other cases, since travel lanes that are not displayed are present on the right side of the display box f6, the display box f6 is a display prohibited box; and the display boxes f2 to f5 between both ends are display permitted boxes, i.e., noting that for the display boxes f1 and f6 at both ends, depending on the location of a travel lane to be displayed, switching between display and non-display of the travel lane is performed.

Note that the following description is made referring to lane data at the left end in the lane data arrangement (e.g., the lane data 101 of FIG. 3(a)) as "start lane data in the lane data arrangement", and referring to lane data at the right end other than "null" in the lane data arrangement (e.g., the lane data 111 of FIG. 3(a)) as "end lane data in the lane data arrangement", and referring to lane data on the left side as "lane data on a start side" and referring to lane data on the right side as "lane data on an end side" as relative expressions. In addition, description is made assuming that currently selected pieces of lane data from one on the start side to one on the end side sequentially correspond to the respective display boxes from one at the left end to one at the right end. Note that the term "correspond" used here indicates that when information is displayed in each display box, lane data serves as the information. That is, when the lane data 101 to 106 of FIG. 3(a) are selected, these pieces of lane data correspond to the display boxes f1 to f6 of FIG. 3(b), respectively.

Specifically, it is determined whether currently selected lane data includes lane data that identifies a recommended lane (hereinafter, referred to as "first determination at SA2").

Figure 3B:
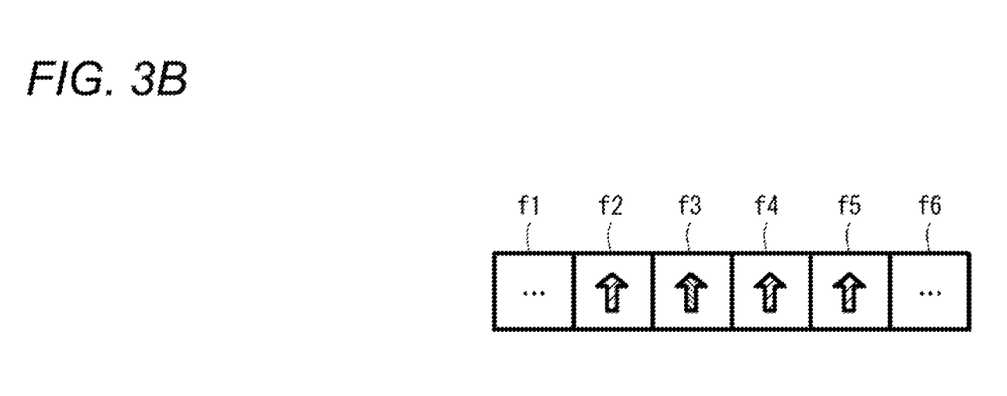

In addition, if it is determined that lane data that identifies a recommended lane is included, it is determined whether the lane data that identifies a recommended lane corresponds to a display box at the left end (the display box f1 of FIG. 3(b)) among the plurality of display boxes, or corresponds to a display box at the right end (the display box f6 of FIG. 3(b)) among the plurality of display boxes, or corresponds to a display box between the display box at the left end and the display box at the right end (hereinafter, a display box between the display box at the left end and the display box at the right end is referred to as "middle display box") (the display boxes f2 to f5 of FIG. 3(b)) (hereinafter, referred to as "second determination at SA2"). In addition, if it is determined that the lane data that identifies a recommended lane corresponds to the display box at the left or right end, it is determined whether the lane data that identifies a recommended lane corresponds to the start or end lane data in the lane data arrangement (hereinafter, referred to as "third determination at SA2"). Then, based on determination results of the "first determination at SA2" to "third determination at SA2", it is determined whether the lane data that identifies a recommended lane is included.

Note that the expression "the lane data that identifies a recommended lane corresponds to a display box at the left end among the plurality of display boxes" is a concept identifying that the lane data that identifies a recommended lane is start lane data among the currently selected lane data, the expression "the lane data corresponds to a middle display box among the plurality of display boxes" is a concept identifying that the lane data that identifies a recommended lane is any one of the second to fifth lane data from the start lane data among the currently selected lane data, and the expression "the lane data corresponds to a display box at the right end among the plurality of display boxes" is a concept identifying that the lane data that identifies a recommended lane is end lane data among the currently selected lane data.

Specifically, when it is determined in the "first determination at SA2" that lane data that identifies a recommended lane is not included, or when it is determined in the "first determination at SA2" that lane data that identifies a recommended lane is included, it is determined in the "second determination at SA2" that the lane data that identifies a recommended lane corresponds to the display box at the left end, and it is determined in the "third determination at SA2" that the lane data that identifies a recommended lane does not correspond to start lane data in the lane data arrangement, or when it is determined in the "first determination at SA2" that lane data that identifies a recommended lane is included, it is determined in the "second determination at SA2" that the lane data that identifies a recommended lane corresponds to the display box at the right end, and it is determined in the "third determination at SA2" that the lane data that identifies a recommended lane does not correspond to end lane data in the lane data arrangement, it is determined that lane data that identifies a recommended lane is not included (NO at SA2), and processing transitions to SA9.

In addition, when it is determined in the "first determination at SA2" that lane data that identifies a recommended lane is included and it is determined in the "second determination at SA2" that the lane data that identifies a recommended lane corresponds to a middle display box, or when it is determined in the "first determination at SA2" that lane data that identifies a recommended lane is included, it is determined in the "second determination at SA2" that the lane data that identifies a recommended lane corresponds to the display box at the left end, and it is determined in the "third determination at SA2" that the lane data that identifies a recommended lane corresponds to start lane data in the lane data arrangement, or when it is determined in the "first determination at SA2" that lane data that identifies a recommended lane is included, it is determined in the "second determination at SA2" that the lane data that identifies a recommended lane corresponds to the display box at the right end, and it is determined in the "third determination at SA2" that the lane data that identifies a recommended lane corresponds to end lane data in the lane data arrangement, it is determined that lane data that identifies a recommended lane is included (YES at SA2), and processing transitions to SA3.

Here, for example, in the case of FIG. 3(a), it is determined in the "first determination at SA2" that lane data that identifies a recommended lane is included, and it is determined in the "second determination at SA2" that the lane data that identifies a recommended lane corresponds to a middle display box, and thus, it is determined that the lane data that identifies a recommended lane is included.

At SA3 of FIG. 2, the identifying part 181 counts lane data. Specifically, the process can be performed in any manner. For example, a total number of lane data that identifies a recommended lane and lane data that identifies a recommended travel lane may be counted noting that the number of recommended lanes is one which is a fixed number, or only lane data that identifies a recommended travel lane may be counted. Here, for example, the latter case in which only lane data that identifies a recommended travel lane is counted is exemplified and described.

Specifically, there is a need to count lane data that identifies a recommended travel lane among the currently selected lane data, taking into account the noted points described at SA2. For example, in a case in which the lane data that identifies a recommended travel lane corresponds to the display box at the left end, only when the lane data is start lane data in the lane data arrangement, the lane data is counted. In a case in which the lane data that identifies a recommended travel lane corresponds to the display box at the right end, only when the lane data is end lane data in the lane data arrangement, the lane data is counted. When the lane data that identifies a recommended travel lane corresponds to a middle display box, regardless of whether the lane data is start or end lane data in the lane data arrangement, etc., the lane data is counted.

Here, for example, when the currently selected lane data is the lane data 101 to 106 of FIG. 3(a), the lane data 104 and 106 are present as lane data that identifies a recommended travel lane. The lane data 104 corresponds to a middle display box and thus is counted. The lane data 106 corresponds to the display box at the right end, but is not end lane data in the lane data arrangement and thus is not counted. In this case, as lane data that identifies a recommended travel lane, "1" is counted.

At SA4 of FIG. 2, the identifying part 181 stores lane data as appropriate. Specifically, the process can be performed in any manner. As will be described later, storing is performed so as to be able to identify lane data whose counting result is maximum at SA2 which is repeatedly performed. For example, start lane data among selected lane data and a counting result at SA3 (i.e., a maximum counting result at the present time) are stored in the RAM in the control part 18. The counting result at SA3 performed this time is compared with a maximum counting result stored in the RAM. When the counting result at SA3 performed this time is less than or equal to the stored maximum counting result, lane data, etc., are not stored. When the counting result at SA3 performed this time is greater than the stored maximum counting result, start lane data among currently selected lane data and the counting result at SA3 performed this time are stored overwritten in the RAM in the control part 18 such that the start lane data and the counting result are associated with each other. Note that when SA4 is performed for the first time, no data is stored in the RAM in the control part 18, and thus, without making the above-described comparison, start lane data among currently selected lane data and a counting result at SA3 performed this time are stored so as to be associated with each other.

Here, for example, when the currently selected lane data is the lane data 101 to 106 of FIG. 3(a), the "lane data 101" which is start lane data among the currently selected lane data and "1" which is a counting result at SA3 performed this time are stored so as to be associated with each other.

At SA5 of FIG. 2, the identifying part 181 shifts the display boxes with respect to the lane data arrangement. Specifically, the process can be performed in any manner. For example, the currently selected lane data in the lane data arrangement is shifted rightward by one piece of lane data, by which a number of pieces of lane data corresponding to the number of display boxes are reselected. Here, for example, when the currently selected lane data is the lane data 101 to 106 of FIG. 3(a), shifting is performed by reselecting the lane data 102 to 107.

At SA6 of FIG. 2, the identifying part 181 determines whether lane data that identifies a recommended lane is contained in a display box. Specifically, the process can be performed in any manner. For example, taking into account the noted points described at SA2, a process similar to that at SA2 is performed. Specifically, it is determined whether the currently selected lane data includes lane data that identifies a recommended lane (hereinafter, referred to as "first determination at SA6"). In addition, if it is determined that lane data that identifies a recommended lane is included, it is determined whether the lane data that identifies a recommended lane corresponds to the display box at the left end, or corresponds to a middle display box, or corresponds to the display box at the right end (hereinafter, referred to as "second determination at SA6"). In addition, if it is determined that the lane data that identifies a recommended lane corresponds to the display box at the right end, it is determined whether the lane data that identifies a recommended lane corresponds to end lane data in the lane data arrangement (hereinafter, referred to as "third determination at SA6"). Then, based on determination results of the "first determination at SA6" to "third determination at SA6", it is determined whether the lane data that identifies a recommended lane is contained in a display box.

Specifically, when it is determined in the "first determination at SA6" that lane data that identifies a recommended lane is included and it is determined in the "second determination at SA6" that the lane data that identifies a recommended lane corresponds to a middle display box, or when it is determined in the "first determination at SA6" that lane data that identifies a recommended lane is included, it is determined in the "second determination at SA6" that the lane data that identifies a recommended lane corresponds to the display box at the right end, and it is determined in the "third determination at SA6" that the lane data that identifies a recommended lane corresponds to end lane data in the lane data arrangement, it is determined that the lane data that identifies a recommended lane is contained in a display box (YES at SA6), and processing transitions to SA3.

In addition, when it is determined in the "first determination at SA6" that lane data that identifies a recommended lane is not included, or when it is determined in the "first determination at SA6" that lane data that identifies a recommended lane is included and it is determined in the "second determination at SA6" that the lane data that identifies a recommended lane corresponds to the display box at the left end, or when it is determined in the "first determination at SA6" that lane data that identifies a recommended lane is included, it is determined in the "second determination at SA6" that the lane data that identifies a recommended lane corresponds to the display box at the right end, and it is determined in the "third determination at SA6" that the lane data that identifies a recommended lane does not correspond to end lane data in the lane data arrangement, it is determined that the lane data that identifies a recommended lane is not contained in a display box (NO at SA6), and processing transitions to SA7.

Here, for example, when reselected lane data is the lane data 102 to 107 of FIG. 3(a), it is determined in the "first determination at SA6" that lane data that identifies a recommended lane is included and it is determined in the "second determination at SA6" that the lane data that identifies a recommended lane corresponds to a middle display box, and thus, it is determined that the lane data that identifies a recommended lane is contained in a display box. Then, when the lane data 102 to 107 of FIG. 3(a) are selected, at SA3, "2" is counted and at SA4, the "lane data 102" and "2" are stored, and then at SA5, the lane data 103 to 108 are reselected and at SA6, it is determined that lane data that identifies a recommended lane is contained in a display box. Then, when the lane data 103 to 108 of FIG. 3(a) are selected, at SA3, "3" is counted and at SA4, the "lane data 103" and "3" are stored, and then at SA5, the lane data 104 to 109 are reselected and at SA6, it is determined that lane data that identifies a recommended lane is contained in a display box. Then, when the lane data 104 to 109 of FIG. 3(a) are selected, at SA3, "3" is counted and at SA4, since the number of pieces of lane data that identify recommended lanes is the same, a state in which the "lane data 103" and "3" are stored is maintained and at SA5, the lane data 105 to 110 are reselected and at SA6, it is determined in the "first determination at SA6" that lane data that identifies a recommended lane is included and it is determined in the "second determination at SA6" that the lane data that identifies a recommended lane corresponds to the display box at the left end, and thus, it is determined that the lane data that identifies a recommended lane is not contained in a display box.

At SA7 of FIG. 2, the identifying part 181 identifies information to be displayed in the display boxes. Specifically, the process can be performed in any manner. For example, first, start lane data most recently stored in the RAM in the control part 18 at SA4 (i.e., start lane data among a plurality of pieces of lane data with a maximum number of recommended travel lanes) is obtained, and a number of pieces of lane data including the obtained start lane data that corresponds to the number of display boxes are continuously obtained starting from the start lane data toward an end side by referring to the lane data arrangement in which lane data is stored at start-up of the display process. That is, by identifying locations of display boxes including a maximum number of recommended travel lanes from among the locations of the display boxes for a plurality of travel lanes obtained when the predetermined number of display boxes are sequentially shifted, travel lanes that can be displayed in the display boxes are identified. Then, the identifying part 181 identifies information to be displayed separately in the display box at the left end, the middle display boxes, and the display box at the right end.

First, for the display box at the left end, the identifying part 181 first determines whether the display box at the left end is a display prohibited box or a display permitted box. Specifically, when start lane data among the above-described obtained lane data is start lane data in the lane data arrangement, it is determined that travel lanes that are not displayed are not present on the left side, and thus, it is determined that the display box at the left end is a display permitted box. On the other hand, when start lane data among the above-described obtained lane data is not start lane data in the lane data arrangement, it is determined that travel lanes that are not displayed are present on the left side, and thus, it is determined that the display box at the left end is a display prohibited box. Then, when the identifying part 181 determines that the display box at the left end is a display permitted box, the identifying part 181 identifies the start lane data among the above-described obtained lane data as information to be displayed in the display box at the left end. On the other hand, when the identifying part 181 determines that the display box at the left end is a display prohibited box, the identifying part 181 identifies " . . . " which is information indicating that in addition to travel lanes displayed in display permitted boxes, not-displayed travel lanes are also present on a display prohibited box side of the plurality of display boxes, as information to be displayed in the display box at the left end.

Then, for the middle display boxes, the identifying part 181 determines that the middle display boxes are display permitted boxes, and then identifies the second to fifth lane data from the start lane data among the above-described obtained lane data, as information to be displayed in the middle display boxes.

First, the display box at the right end is the same as the case of the display box at the left end, and the identifying part 181 first determines whether the display box at the right end is a display prohibited box or a display permitted box. Specifically, when end lane data among the above-described obtained lane data is end lane data in the lane data arrangement, it is determined that travel lanes that are not displayed are not present on the right side, and thus, it is determined that the display box at the right end is a display permitted box. On the other hand, when end lane data among the above-described obtained lane data is not end lane data in the lane data arrangement, it is determined that travel lanes that are not displayed are present on the right side, and thus, it is determined that the display box at the right end is a display prohibited box. Then, when the identifying part 181 determines that the display box at the right end is a display permitted box, the identifying part 181 identifies the end lane data among the above-described obtained lane data as information to be displayed in the display box at the right end. On the other hand, when the identifying part 181 determines that the display box at the right end is a display prohibited box, the identifying part 181 identifies " . . . " which is information indicating that in addition to travel lanes displayed in display permitted boxes, not-displayed travel lanes are also present on a display prohibited box side of the plurality of display boxes, as information to be displayed in the display box at the right end.

Here, for example, the lane data 103 of FIG. 3(a) is obtained as start lane data stored at SA4, and then the lane data 103 to 108 are obtained. Then, it is determined that the display box f1 which is the display box at the left end is a display prohibited box because the lane data 103 which is start lane data among the obtained lane data is not the lane data 101 which is start lane data in the lane data arrangement, and then " . . . " is identified. Then, it is determined that the display boxes f2 to f5 which are the middle display boxes are display permitted boxes, and then the lane data 104 to 107 are identified. Then, it is determined that the display box f6 which is the display box at the right end is a display prohibited box because the lane data 108 which is end lane data among the obtained lane data is not the lane data 111 which is end lane data in the lane data arrangement, and then " . . . " is identified.

At SA8 of FIG. 2, the display part 182 displays travel lanes in the display boxes. Specifically, the process can be performed in any manner. The pieces of information identified at SA2 are displayed in their corresponding display boxes. Here, for example, as shown in FIG. 3(b), " . . . ", the lane data 104 to 107, and " . . . " are displayed in the display boxes f1 to f6, and are displayed on the display 14. Then, by performing, for example, an operation of pressing " . . . " by a predetermined operation by the user through the touch pad 13, pieces of information that identify travel lanes that are not displayed are scrolled and displayed.

In addition, at SA9 performed after determining at SA2 of FIG. 2 that lane data that identifies a recommended lane is not included (NO at SA2), the identifying part 181 shifts the display boxes with respect to the lane data arrangement. Specifically, the process can be performed in any manner. For example, a process similar to that at SA5 is performed, and processing transitions to SA2 and each of the above-described processes is performed.

Figure 4B:
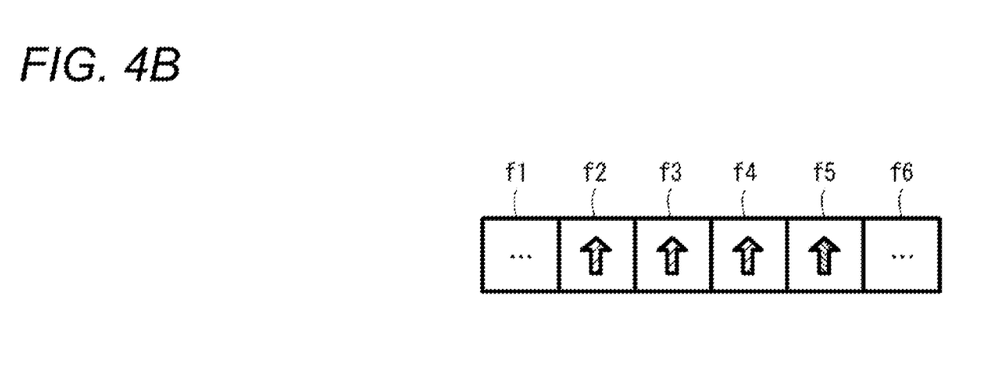
Figure 5B:
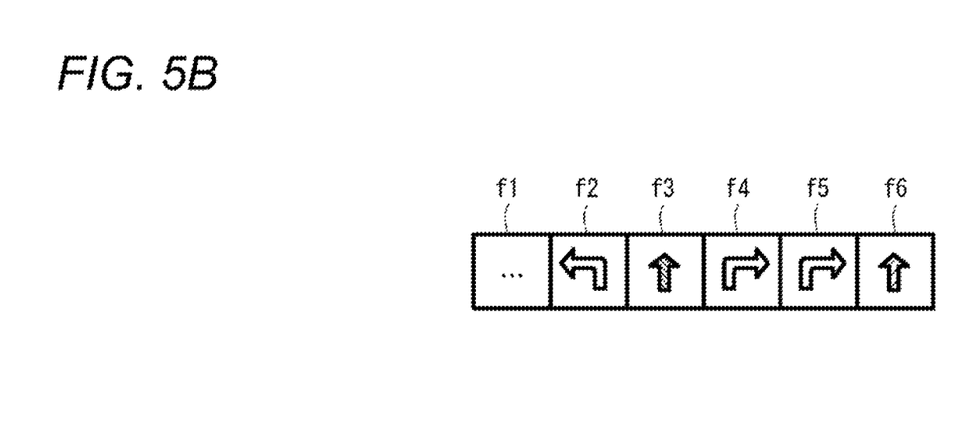

Note that when lane data 201 to 216 stored in a lane data arrangement of FIG. 4(a) are stored at start-up of a display process, by performing the display process, display boxes f1 to f6 in a state shown in FIG. 4(b) are displayed on the display 14. In addition, when lane data 301 to 316 stored in a lane data arrangement of FIG. 5(a) are stored at start-up of a display process, by performing the display process, display boxes f1 to f6 in a state shown in FIG. 5(b) are displayed on the display 14. By this, the display process ends.

Advantageous Effects of the Embodiment

As such, according to the present embodiment, travel lanes are identified such that a recommended lane which is a travel lane recommended for the vehicle to travel is displayed in a display box and a maximum number of recommended travel lanes including travel lanes in the same direction as the recommended lane are displayed in display boxes. By this, for example, travel lanes can be displayed so as to meet the realities that it is easier for a driver to make a determination about a lane change when as many recommended travel lanes as possible are displayed, the recommended travel lanes being lanes travelable in the same direction as a recommended lane. Thus, for example, unnecessary movement between travel lanes can be reduced, enabling the vehicle to smoothly travel.

In addition, travel lanes that can be displayed in the display boxes are identified while travel lanes and the display boxes are relatively shifted in turn from a travel lane at one end of the plurality of travel lanes. By this, for example, travel lanes that can be displayed can be identified by a reliable process which is relative shifting, and thus, the vehicle can securely smoothly travel.

In addition, locations of display boxes including a maximum number of recommended travel lanes are identified from among locations of the display boxes for a plurality of travel lanes obtained when the predetermined number of display boxes are sequentially shifted. By this, for example, travel lanes that can be displayed can be identified by a comparatively simple process of identifying locations of display boxes that include a maximum number of recommended travel lanes when relative shifting is performed, and thus, the vehicle can securely smoothly travel.

In addition, information indicating that in addition to travel lanes displayed in display permitted boxes, not-displayed travel lanes are also present on a display prohibited box side of the plurality of display boxes is displayed in a display prohibited box. By this, for example, the driver can be aware of the fact that in addition to travel lanes displayed in the display boxes, travel lanes are actually present, and thus, the vehicle can more smoothly travel.

Variants of the Embodiment

Although the embodiment according to the present disclosure is described above, specific configurations and means of the present disclosure can be arbitrarily changed and modified without departing from the technical ideas of the present disclosure recited in the claims. Such variants will be described below.

For Problems to be Solved and Advantageous Effects of the Disclosure

First, problems to be solved by the disclosure and advantageous effects of the disclosure are not limited to the above-described content, and may vary depending on the implementation environment of the disclosure or the details of a configuration, and only one of the above-described problems may be solved, or only one of the above-described advantageous effects may be provided.

For Separation and Integration

In addition, each of the above-described electrical components is function-conceptual, and does not necessarily need to be physically configured in the manner shown in the drawing. Namely, a specific mode of separation and integration of parts is not limited to the one shown in the drawing, and all or part thereof can be configured so as to be functionally or physically separated or integrated in any unit, according to various types of loads, the status of use, etc. In addition, a "device" in the present application is not limited to a device configured by a single device, and includes a device configured by a plurality of devices. For example, the configuration may be such that at least one of the functions of the in-vehicle device 1 is provided on the center device which is not shown, and then by the in-vehicle device 1 and the center device communicating with each other, the same process as that of the embodiment is performed. In addition, for example, the configuration may be such that the display part 182 performs at least one of the processes performed by the identifying part 181, or reversely, the configuration may be such that the identifying part 181 performs at least one of the processes performed by the display part 182.

For Shapes, Numerical Values, Structures, and Time Sequence

For the components exemplified in the embodiment and the drawings, shapes, numerical values, or a mutual relationship between a plurality of components in terms of structure or time sequence can be arbitrarily changed and modified without departing from the technical ideas of the present disclosure.

For Display Permitted Boxes and Display Prohibited Boxes

In addition, although the above-described embodiment describes a case in which information is displayed separately in display permitted boxes and display prohibited boxes, the configuration is not limited thereto, and all display boxes may be used as display permitted boxes, and pieces of information that identify travel lanes may be displayed.

For a Process of the Identifying Part

In addition, although the above-described embodiment exemplifies and describes a technique in which the identifying part 181 which is identifying means identifies travel lanes that can be displayed in the display boxes while relatively shifting in turn a plurality of travel lanes and the display boxes from a travel lane at one end of the plurality of travel lanes, the configuration may be such that travel lanes are identified by any other technique than the above-described technique.

Some of the Features and Advantageous Effects of the Embodiment

Finally, some of the features and advantageous effects of the embodiment described so far are exemplified below. Note, however, that the features and advantageous effects of the embodiment are not limited to the following content, and there is a case in which only one of the following advantageous effects is provided by having only one of the following features, or a case in which other advantageous effects than the following advantageous effects are provided by having other features than the following features.

A display system according to one aspect 1 of the embodiment displays travel lanes of a vehicle in a predetermined number of display boxes, and includes identifying means for identifying travel lanes that can be displayed in the display boxes, and identifying travel lanes such that a recommended lane which is a travel lane recommended for the vehicle to travel is displayed in one of the display boxes and a maximum number of recommended travel lanes which are travel lanes whose traveling directions coincide with a traveling direction of the recommended lane each are displayed in one of the display boxes; and display means for displaying the travel lanes identified by the identifying means in the display boxes.

According to the display system according to the above-described aspect 1, travel lanes are identified such that a recommended lane which is a travel lane recommended for the vehicle to travel is displayed in a display box and a maximum number of recommended travel lanes which are travel lanes whose traveling directions coincide with a traveling direction of the recommended lane are displayed in display boxes. By this, for example, travel lanes can be displayed so as to meet the realities that it is easier for a driver to make a determination about a lane change when as many recommended travel lanes as possible are displayed, the recommended travel lanes being travel lanes whose traveling directions coincide with a traveling direction of a recommended lane. Thus, for example, unnecessary movement between travel lanes can be reduced, enabling the vehicle to smoothly travel.

A display system according to another aspect 2 of the embodiment is such that in the display system according to the above-described aspect 1, the identifying means identifies travel lanes that can be displayed in the display boxes, while relatively shifting in turn a plurality of travel lanes and the display boxes from a travel lane at one end of the plurality of travel lanes, the plurality of travel lanes being on a traveling direction side of the vehicle and being adjacent to each other.

According to the display system according to the above-described aspect 2, travel lanes that can be displayed in the display boxes are identified while travel lanes and the display boxes are relatively shifted in turn from a travel lane at one end of the plurality of travel lanes. By this, for example, travel lanes that can be displayed can be identified by a reliable process which is relative shifting, and thus, the vehicle can securely smoothly travel.

A display system according to another aspect 3 of the embodiment is such that in the display system according to the above-described aspect 2, the identifying means identifies travel lanes that can be displayed in the display boxes, by identifying locations of corresponding ones of the display boxes including a maximum number of the recommended travel lanes from among locations of the display boxes for a plurality of travel lanes obtained when the predetermined number of the display boxes are sequentially shifted.

According to the display system according to the above-described aspect 3, locations of display boxes including a maximum number of recommended travel lanes are identified from among locations of the display boxes for a plurality of travel lanes obtained when the predetermined number of display boxes are sequentially shifted. By this, for example, travel lanes that can be displayed can be identified by a comparatively simple process of identifying locations of display boxes that include a maximum number of recommended travel lanes when relative shifting is performed, and thus, the vehicle can securely smoothly travel.

A display system according to another aspect 4 of the embodiment is such that in the display system according to any one of the above-described aspects 1 to 3, when a travel lane that is not displayed is present adjacent to a travel lane to be displayed in a display box at an end of the plurality of display boxes, the identifying means determines that the display box at the end is a display prohibited box that does not display a travel lane, the identifying means identifies travel lanes such that in display permitted boxes which are those of the plurality of display boxes other than the display prohibited box, the recommended lane is displayed and a maximum number of the recommended travel lanes are displayed, and the display means displays, in the display prohibited box, information indicating that in addition to travel lanes displayed in the display permitted boxes, a not-displayed travel lane is also present on the display prohibited box side of the plurality of display boxes.

According to the display system according to the above-described aspect 4, information indicating that in addition to travel lanes displayed in display permitted boxes, a not-displayed travel lane is also present on a display prohibited box side of the plurality of display boxes is displayed in a display prohibited box. By this, for example, the driver can be aware of the fact that in addition to travel lanes displayed in the display boxes, a travel lane is actually present, and thus, the vehicle can more smoothly travel.

A display program according to another aspect 5 of the embodiment displays travel lanes of a vehicle in a predetermined number of display boxes, and causes a computer to function as identifying means for identifying travel lanes that can be displayed in the display boxes, and identifying travel lanes such that a recommended lane which is a travel lane recommended for the vehicle to travel is displayed in one of the display boxes and a maximum number of recommended travel lanes which are travel lanes whose traveling directions coincide with a traveling direction of the recommended lane each are displayed in one of the display boxes; and display means for displaying the travel lanes identified by the identifying means in the display boxes.

According to the display program according to the above-described aspect 5, travel lanes are identified such that a recommended lane which is a travel lane recommended for the vehicle to travel is displayed in a display box and a maximum number of recommended travel lanes which are travel lanes whose traveling directions coincide with a traveling direction of the recommended lane are displayed in display boxes. By this, for example, travel lanes can be displayed so as to meet the realities that it is easier for a driver to make a determination about a lane change when as many recommended travel lanes as possible are displayed, the recommended travel lanes being travel lanes whose traveling directions coincide with a traveling direction of a recommended lane. Thus, for example, unnecessary movement between travel lanes can be reduced, enabling the vehicle to smoothly travel.

REFERENCE SIGNS LIST

1: In-vehicle device, 11: Communication part, 12: Photographing part, 13: Touch pad, 14: Display, 15: Speaker, 16: Current location detecting part, 17: Data recording part, 18: Control part, 100: Navigation system, 171: Map information DB, 181: Identifying part, 182: Display part, 101 to 116: Lane data, 201 to 216: Lane data, 301 to 316: Lane data, and f1 to f6: Display box

The invention claimed is:

1. A display system that displays travel lanes of a vehicle in a predetermined number of display boxes, the display system comprising:
an identifying part for identifying travel lanes that can be displayed in the display boxes, and identifying travel lanes such that a recommended lane is displayed in one of the display boxes and a maximum number of recommended travel lanes each are displayed in a different one of the display boxes, the recommended lane being a travel lane recommended for the vehicle to travel, and the recommended travel lanes being travel lanes whose traveling directions coincide with a traveling direction of the recommended lane; and
a display part for displaying the travel lanes identified by the identifying part in the display boxes, wherein the identifying part identifies travel lanes that can be displayed in the display boxes, while relatively shifting in turn a plurality of travel lanes and the display boxes from a travel lane at one end of a plurality of travel lanes, the plurality of travel lanes being on a traveling direction side of the vehicle and being adjacent to each other.

2. The display system according to claim 1, wherein the identifying part identifies travel lanes that can be displayed in the display boxes, by identifying locations of corresponding ones of the display boxes including a maximum number of the recommended travel lanes from among locations of the display boxes for a plurality of travel lanes obtained when the predetermined number of the display boxes are sequentially shifted.

3. A display system that displays travel lanes of a vehicle in a predetermined number of display boxes, the display system comprising:

an identifying part for identifying travel lanes that can be displayed in the display boxes, and identifying travel lanes such that a recommended lane is displayed in one of the display boxes and a maximum number of recommended travel lanes each are displayed in a different one of the display boxes, the recommended lane being a travel lane recommended for the vehicle to travel, and the recommended travel lanes being travel lanes whose traveling directions coincide with a traveling direction of the recommended lane; and a display part for displaying the travel lanes identified by the identifying part in the display boxes, wherein when a travel lane that is not displayed is present adjacent to a travel lane to be displayed in a display box at an end of the plurality of display boxes, the identifying part determines that the display box at the end is a display prohibited box that does not display a travel lane, the identifying part identifies travel lanes such that in display permitted boxes, the recommended lane is displayed and a maximum number of the recommended travel lanes are displayed, the display permitted boxes being those of the plurality of display boxes other than the display prohibited box, and the display part displays, in the display prohibited box, information indicating that in addition to travel lanes displayed in the display permitted boxes, a not-displayed travel lane is also present on the display prohibited box side of the plurality of display boxes.

4. A non-transitory recordable storage medium storing a display program that displays travel lanes of a vehicle in a predetermined number of display boxes, the display program causing a computer to function as:

an identifying part for identifying travel lanes that can be displayed in the display boxes, and identifying travel lanes such that a recommended lane is displayed in one of the display boxes and a maximum number of recommended travel lanes each are displayed in a different one of the display boxes, the recommended lane being a travel lane recommended for the vehicle to travel, and the recommended travel lanes being travel lanes whose traveling directions coincide with a traveling direction of the recommended lane; and a display part for displaying the travel lanes identified by the identifying part in the display boxes, wherein the identifying part identifies travel lanes that can be displayed in the display boxes, while relatively shifting in turn a plurality of travel lanes and the display boxes from a travel lane at one end of a plurality of travel lanes, the plurality of travel lanes being on a traveling direction side of the vehicle and being adjacent to each other.

* * * * *